United States Patent [19]

Nollet

[11] Patent Number: 4,751,628
[45] Date of Patent: Jun. 14, 1988

[54] AUTOMATIC SYMMETRY CORRECTION CIRCUIT FOR A SYMMETRICAL CURRENT CHOPPER

[75] Inventor: Michel Nollet, Noisy Le Roi, France

[73] Assignee: Thomson-LGT Laboratoire General des Telecommunications, Conflans Sainte Honorine, France

[21] Appl. No.: 937,357

[22] Filed: Dec. 3, 1986

[30] Foreign Application Priority Data

Dec. 13, 1985 [FR]  France ................................ 85 18527

[51] Int. Cl.$^4$ ............................................ H02M 3/315
[52] U.S. Cl. ........................................ 363/26; 363/56; 363/97
[58] Field of Search ........................ 363/24, 25, 26, 56, 363/97, 133, 134

[56] References Cited

U.S. PATENT DOCUMENTS

| | | | |
|---|---|---|---|
| 4,233,658 | 11/1980 | Lupatin et al. ................ | 363/134 X |
| 4,293,902 | 10/1981 | White .................................... | 363/26 |
| 4,301,499 | 11/1981 | Levinson ................................ | 363/26 |
| 4,541,041 | 9/1985 | Park et al. .............................. | 363/41 |
| 4,553,198 | 11/1985 | Chan et al. ........................ | 363/97 X |

FOREIGN PATENT DOCUMENTS 2096584  2/1972  France .

Primary Examiner—Patrick R. Salce
Assistant Examiner—Kristine Peckman
Attorney, Agent, or Firm—Cushman, Darby & Cushman

[57] ABSTRACT

An automatic symmetry correction circuit is provided for a symmetrical current chopper. This structure includes two current channels controlled alternately by two signals of frequency f.

A resonant LC circuit is tuned to the frequency f and energized by the currents passing through each of the two channels.

A control circuit is coupled to the resonance circuit for adjusting the symmetry between the amplitudes of the currents flowing through each of the two channels as a function of the amplitude of the oscillations of frequency f generated by the resonance circuit.

6 Claims, 1 Drawing Sheet

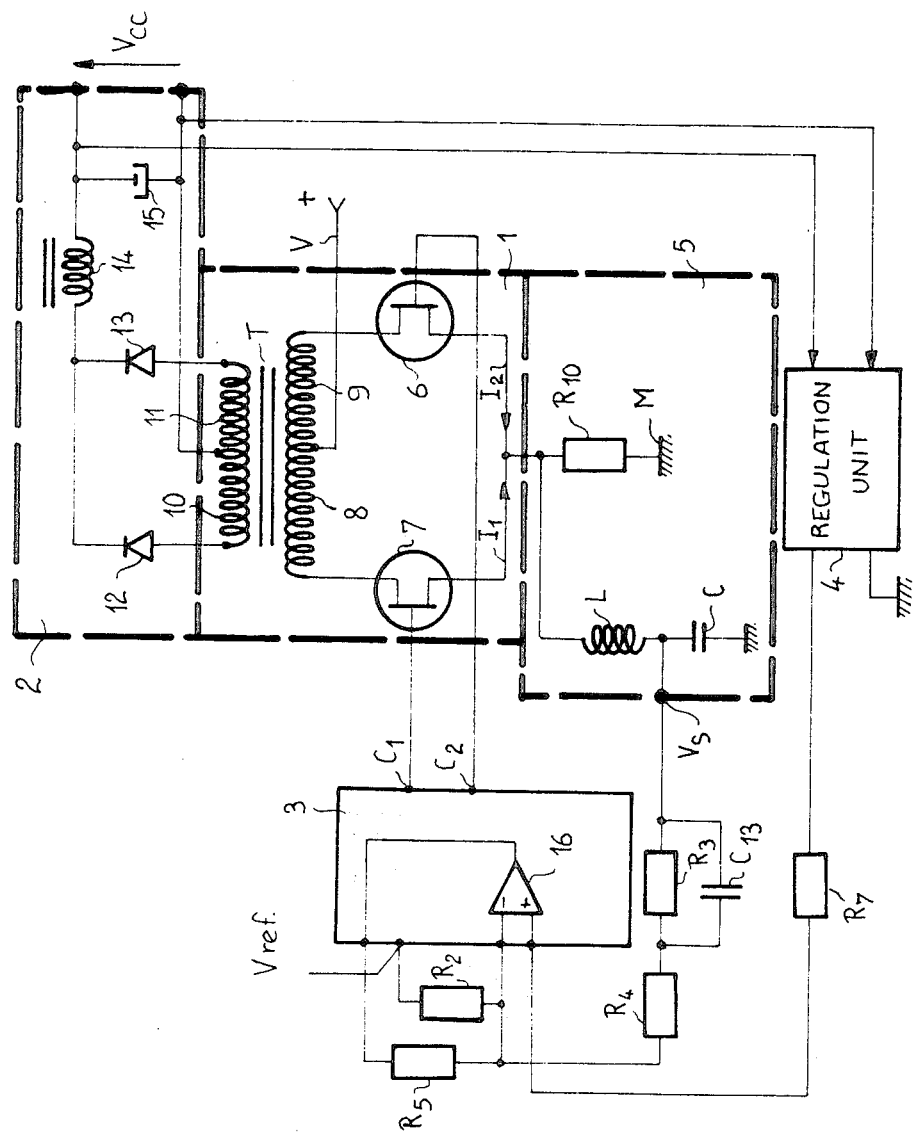

AUTOMATIC SYMMETRY CORRECTION CIRCUIT FOR A SYMMETRICAL CURRENT CHOPPER

BACKGROUND OF THE INVENTION

The present invention relates to an automatic symmetry correction circuit for a symmetrical current chopper. It applies to the construction of static DC converters and regulators having current choppers with transformers.

Among the known constructions of DC current converters or regulators with a transformer, the symmetrical circuits have at least three advantages as compared with asymmetric circuits. These advantages may be summed up in the following way:

1. They use the entire hysteresis cycle of the core of the transformer. This allows the size of this latter to be reduced, as well as its price for comparable output frequency, efficiency and power
2. The pulsed currents called for and delivered have a frequency double the operating frequency, which facilitates filtering.
3. The cyclic ratio, i.e. the ratio of the energy transfer time to the duration of a cycle may be very close to unity, which reduces the efficient currents present in all the power components.

Although symmetrical circuits have been interesting from a theoretical point of view, there are many problems in actually constructing one. They generally require a large number of components which the asymmetric circuits do not. Their control circuit is more complex. The risks of simultaneous conduction in the two conduction channels and the maintenance of perfect operating symmetry between the two channels lead to further difficulties of construction.

The causes of operating asymmetry are numerous. Among them exist those due to the differences of characteristics of two symmetrically connected components, those resulting from a symmetry of wiring or arrangement of the integrated circuits on the printed circuit, those resulting from a difference in length of the control square waves of two switches due, for example, to an imperfection of the control circuit or to the reintroduction into the sensitive stages of the control circuit of a part of the voltage square wave or of the current saw tooth wave present in the primary and the secondary of the transformer, introduced through non symmetrical capacitive or inductive parasite connections.

Asymmetry of operation results in a shift of the operating point of the transformer with respect to its magnetic dynamics, reduction of the energy efficiency and a reduction of the reliability. It leads to over dimensioning the power components and finally it is the cause of risks of instability.

SUMMARY OF THE INVENTION

The aim of the invention is to overcome the above drawbacks.

For this, the invention provides an automatic symmetry correction circuit for a symmetrical current chopper having two current channels controlled alternately by two signals of frequency f, coupled by a common connection point to a DC supply terminal of the chopper through a resistor, a resonant circuit tuned to the frequency f connected in parallel to the ends of the resistor, as well as a control circuit coupled to the resonant circuit for adjusting the symmetry between the amplitudes of the currents flowing through each of the two channels as a function of the amplitude of the frequency oscillations generated by the resonance circuit.

BRIEF DESCRIPTION OF THE DRAWING

Other features and advantages of the invention will be clear from the following description with reference to the single accompanying FIGURE which shows a chopped power supply having an automatic symmetry correction device according to the invention.

DESCRIPTION OF THE PREFERRED EMBODIMENT

The chopped power supply which is shown in the single FIG. 1 includes a current chopping circuit 1 coupled to a rectifying and filtering cell 2, shown inside broken line rectangles. The chopped power supply shown also includes a control circuit 3 with pulse width modulation and a regulation unit 4. The automatic symmetry correction circuit of the invention is shown at 5 inside a broken line rectangle. The current chopper circuit 1 is formed by two current switches 6 and 7 formed by transistors, thyristors or any equivalent device, connected in a "push-pull" mode, respectively to one end of two primary half windings 8 and 9 of a transformer T. The respective ends of the primary half windings 8 and 9 which are not connected to the current switches 6 and 7 are connected together so as to form a middle point of the primary of transformer T and so as to receive the DC supply voltage V+ of the chopper circuit 1. The other two ends of the current switches 6 and 7 are also connected to the power supply ground M of the chopper circuit 1 through a resistor R10 included in the correction circuit 5.

The secondary of transformer T is formed by two half windings 10 and 11 whose two ends are connected together so as to form a middle point and whose other two ends are connected to rectifying diode anodes 12 and 13 of the rectifying and filtering cell 2. The cathodes of diodes 12 and 13 are connected together so as to form a full wave rectifying circuit and the point common to the two cathodes of diodes 12 and 13 is connected to one end of a filtering inductance 14 which forms, with a capacitor 15, a low pass filter in the rectifying and filtering cell 2, for filtering out the mean component of the current delivered by the two diodes 12 and 13. The output voltage $V_{CC}$ of the chopped power supply shown in the single FIGURE, is taken from the terminals of capacitor 15.

The current switches 6 and 7 of the current chopper circuit are controlled by two outputs C1 and C2 of the control circuit 3. These outputs control alternately the passage of the current through the current switches 6 and 7. In a preferred embodiment of the invention, the control circuit 3 is formed by the component known under the reference SG1524 and commercialized by the firm Silicon General. This component includes typically a constant frequency saw tooth generator, a comparator comparing the saw tooth signal with the output signal of an operational amplifier 16 and, a sorting logic directing the result of this comparison t6 alternately output C1 and C2. The operational amplifier 16 is connected at its "−" input to a reference voltage marked Vref, through a resistor R2. The operational amplifier is further connected to an output marked VS of the automatic correction circuit 5 through two series connected resistors R3 and R4. A resistor R5 is also connected between the output and the input marked "−" of the operational amplifier 16 so as to provide a summation of the voltages $V_s$ and Vref through summation resistors R3, R4 and R2. The input marked "+" of the operational amplifier 16 is connected to an output of the regulation unit 4 which compares the amplitude of the voltage VCC obtained at the terminals of capacitor 15 with a reference voltage, not shown, internal to the regulation unit, for applying an error signal to the input marked "+" of the operational amplifier 16 through a resistor R7.

The circuit which has just been described is completed by the circuit 5 including a series resonance circuit formed by an inductance L and a capacitor C connected in series to the terminals of resistor R10 coupling the two conduction channels formed by the two switches 6 and 7. The point common to the inductance L and to the capacitor C is connected to the output terminal $V_s$ of the automatic correction circuit 5.

The operation of the chopped supply is explained hereafter, on the assumption that the control signals delivered by the output C1 and C2 of the control circuit 3 are applied to the control inputs of switches 6 and 7 with frequencies close to 50 KHz. In the embodiment which has just been described, each of the currents $I_1$ and $I_2$ delivered respectively by the current switches 6 and 7 flow through the common coupling resistor R10 connecting the ground of the power supply circuit of the chopped supply to each of the current switches 6 and 7. On the assumption that the operation of these switches is strictly symmetrical, the signals obtained at the terminals of resistor R10 is a trapezoidal signal of frequency 2f equal to 100 KHz. Assuming that an asymmetry occurs in the operation of the chopped power supply, one trapezium out of two has its amplitude increased and a modulation component of frequency f appears at the terminals of resistor R10. This modulation at the residual frequency f is used by the resonance circuit formed by the inductance L and the capacitor C, whose values are adjusted so as to form a plug circuit, resonating so that the relationship $$\cdot L\cdot C(2\pi\cdot f)^2 = 1 \text{ is confirmed.}$$

Under these conditions, the circuit formed by inductance L and capacitor C begins to resonate at the frequency f, equal to 50 KHz, of the control signals applied to the control inputs of switches 6 and 7. The signal which appears at the terminals of capacitor C is a sinusoidal signal whose amplitude at frequency f is proportional to the extent of the symmetry defect. This signal is applied by the output $V_s$ of the correction circuit 5 to the input marked "−" of the operational amplifier 16 through resistors R3 and R4, which allows the signal marking the symmetry defect to be added to the error signal delivered by the regulation unit 4 and opening of switches 6 and 7 to be ordered so as to correct the defect of symmetry detected by the correction circuit 5.

It should be noted that for improving the correction of the symmetry of the two conduction channels formed by the current switches 6 and 7, the phase of the correction signal should be advanced. It is also possible to advance the phase of the correction signal by judiciously adjusting the values of the capacitor C or of inductance L about its ideal value which exactly confirms the relationship:

$$L\cdot C\cdot (2\cdot \pi\cdot f)^2 = 1.$$

What is claimed is:

1. An automatic symmetry correction circuit for a symmetrical current chopper, comprising:
    means for forming two channels, through each of which current from a source of voltage can flow when controlled by respective control signals, said two current channels coupled together by a common connection point at one end and coupled to said source of voltage at the other end;
    a resistor, connected to said connection point at one end and to said voltage source at the other end;
    means for alternately controlling said two channels by producing control signals at a frequency f;
    a series resonance circuit, tuned to said frequency f, connected in parallel to said resistor; and
    a control circuit, coupled to said series resonance circuit, for adjusting the symmetry of the currents flowing through each of said current channels as a function of the amplitude of the oscillations of frequency f generated by said resonance circuit.

2. The circuit as claimed in claim 1, wherein said series resonance circuit includes at least one inductance and one capacitor connected in series, a common point between the inductance and the capacitor being coupled to an input of the control circuit, for adjusting the symmetry of the currents flowing through the two channels.

3. An automatic symmetry correction circuit for a symmetrical current chopper, comprising:
    a transformer, having a primary coil with two ends, and a secondary coil;
    first and second switch means, each having a control receiving input and first and second terminals, for selectively passing current between said first and second terminals responsive to a state of a control signal on said control receiving input, said first switch means connected by one of said first and second terminals to one end of said transformer primary coil, and said second switch means connected by the other of its first and second terminals to the other end of said transformer primary coil, the other terminals of said first and second switch means being coupled together at a connection point;
    a resistor, coupled at one end to said connection point, and adapted to receive DC current at said other end;
    a series resonance circuit, having a resonance frequency f, coupled across said resistor; and
    control means, coupled to said series resonance network and to said control receiving inputs of said first and second switching means, for generating periodic signals of said frequency f to alternately turn on and off said first and second switching means.

4. A circuit as in claim 3, wherein said series resonance network includes an inductor and a capacitor coupled together at a connection point which is coupled to said control means.

5. A circuit as in claim 4, wherein said primary coil of said transformer is center tapped, and wherein said center tap is connected to a source of DC voltage.

6. Apparatus as in claim 5 further comprising means for rectifying and filtering means, connected to said secondary of said transformer, for producing a rectified output.

* * * * *